United States Patent [19]

Sandberg et al.

[11] E Patent Number: Re. 32,846

[45] Reissued Date of Patent: Jan. 31, 1989

[54] SNAP STUD

[75] Inventors: Christopher T. Sandberg, Owatonna; Gary F. Paulson, Waseca, both of Minn.

[73] Assignee: Truth Incorporated, Owatonna, Minn.

[21] Appl. No.: 4,175

[22] Filed: Jan. 12, 1987

Related U.S. Patent Documents

Reissue of:

[64] Patent No.: 4,593,431
Issued: Jun. 10, 1986
Appl. No.: 746,443
Filed: Jun. 19, 1985

U.S. Applications:

[63] Continuation of Ser. No. 589,307, Mar. 14, 1984, abandoned.

[51] Int. Cl.[4] ..... E05D 5/12

[52] U.S. Cl. ..... 16/381; 16/DIG. 40; 403/155; 403/326; 411/353; 411/517

[58] Field of Search ..... 16/262, 380, 381, 386, 16/DIG. 40, 363, 364, 368, 370; 411/353, 517, 518; 403/155, 326

[56] References Cited

U.S. PATENT DOCUMENTS

| | | | |
|---|---|---|---|
| 738,503 | 9/1903 | Waters | 411/517 X |
| 2,323,400 | 7/1943 | Jacobi | 403/326 X |
| 2,368,611 | 1/1945 | Charnock | 403/326 X |
| 3,138,188 | 6/1964 | Tuozzo et al. | 411/353 |
| 4,137,603 | 2/1979 | Kvasnes | 16/381 |
| 4,241,541 | 12/1980 | Van Klompenburg | 49/249 |

FOREIGN PATENT DOCUMENTS

| | | | |
|---|---|---|---|
| 282171 | 4/1952 | Switzerland | 411/517 |
| 242130 | 11/1925 | United Kingdom . | |
| 385121 | 12/1932 | United Kingdom . | |
| 480416 | 2/1938 | United Kingdom . | |
| 759078 | 10/1956 | United Kingdom . | |
| 1188550 | 4/1970 | United Kingdom . | |
| 1332913 | 10/1973 | United Kingdom | 16/381 |
| 2020347 | 4/1978 | United Kingdom | 16/381 |
| 1542633 | 3/1979 | United Kingdom . | |
| 2081803 | 8/1980 | United Kingdom | 16/370 |

*Primary Examiner*—Fred A. Silverberg
*Attorney, Agent, or Firm*—Wood, Dalton, Phillips, Mason & Rowe

[57] ABSTRACT

A snap stud usable in window hardware, such as window operators and window hinges, for releasably pivotally interconnecting a pair of members. The snap stud has a stud extending from a first of the members and provided with an external peripheral groove which mounts a C-ring of spring music wire. The C-ring has a retention position partially extending beyond the periphery of the stud for overlying a second of the members and a compressed release position substantially entirely within the periphery of the stud, with the movement of the C-ring to the compressed release position occurring automatically in assembly and disassembly of said members.

10 Claims, 1 Drawing Sheet

SNAP STUD

Matter enclosed in heavy brackets [ ] appears in the original patent but forms no part of this reissue specification; matter printed in italics indicates the additions made by reissue.

[This is a continuation of application Ser. No. 589,307 filed Mar. 14, 1984, now abandoned.]

*This is an application for reissue of U.S. Patent 4,593,431, which issued from Ser. No. 746,443, filed June 19, 1985, which is a continuation of Ser. No. 589,307, filed March 14, 1984, now abandoned.*

TECHNICAL FIELD

This invention pertains to a snap stud particularly for use in window hardware for releasably pivotally interconnecting two members. The snap stud is constructed to facilitate assembly of the window hardware by use of automatic equipment and to releasably retain the window hardware members in pivotally interconnected relation whereby the members may be separated for movement by a window free of restraint by the window hardware.

BACKGROUND ART

There are many different types of window hardware having pivotally interconnected members. One type is a window operator having an operating arm connected to a bracket mounted to a window sash. A releasable connection is achieved by the use of a slidable keeper member on the operating arm which, in one position, interfits with a stud on the bracket to lock the parts together in a pivotally interconnected relation. A slidable keeper of this type is shown in Armstrong U.S. Pat. No. 3,457,675.

Another type of window hardware is a window hinge. A sash arm is pivotally attached to a slider or shoe movable along a guide track fixed to a window sill and a support arm or link extends between the guide track and the sash arm and is pivotally connected to both. A commercial embodiment of a window hinge utilizes a keeper and stud structure of the type shown in the referred to Armstrong patent for releasably connecting the support arm to the guide track. In assembly, the sash arm must be manually oriented with the end adapted for mounting the keeper positioned adjacent the guide track and the keeper must be manually handled.

The present commercial window hardware using a slidably mounted keeper is not readily assembled by use of automatic equipment because of the required handling of the keeper and orientation of the hardware elements.

DISCLOSURE OF THE INVENTION

A primary feature of the invention is to provide a snap stud for releasably holding a pair of members, such as components of window hardware, in pivotally interconnected relation and which avoids the need for a slidably mounted keeper with resulting cost reduction and the ability to perform part of the assembly of the window hardware on automatic equipment because of ease of handling and orientation of components.

Another feature of the invention is to provide a snap stud for releasably holding a pair of members in interconnected relation. The snap stud has a stud extending from a first member and has a C-ring of spring wire mounted thereon which has a retention position extending beyond the periphery of the stud and which may be compressed to a position substantially within the periphery of the stud when the stud is inserted in an opening in a second member. This permits passage of the second member into assembled relation with the first member and with the C-ring returning to its retention position overlying the second member for releasably retaining the members in assembled relation. The snap stud enables separation and assembly of the members relative to each other to be accomplished without tools and the snap stud emits a positive "snap" sound when returning to its retention position, thereby signalling proper interconnection of the members to each other.

The snap stud replaces the slidable keeper used in the prior commercial window hardware structures and thus avoids a number of problems encountered in the use of a keeper, including special orientation of the member which is to mount the keeper, difficulty in manufacturing the keeper, the inability to automatically manipulate the keeper in assembly processes as well as possible damage thereto during assembly. Additionally, the snap stud is not readily apparent as constituting a releasable connection between the members and, therefore, the window hardware is more tamper-proof than when a keeper is used which is readily visible as being a member which, when moved, will disconnect the two members and permit movement of a window sash independently of the window hardware. Further, the use of the snap stud in place of the stud and keeper of the prior art results in a cost savings of approximately ⅓ in the cost of the parts.

An object of the invention is to provide a snap stud for mounting on a first member and releasably holding a second member in pivotal relation with the first member comprising a generally cylindrical stud having an external peripheral groove intermediate the ends of the stud, and a C-ring of spring wire positioned in said peripheral groove and having a pair of spaced-apart ends, said C-ring having inner and outer diameters selected to have a part thereof in said peripheral groove and a part extending beyond the stud periphery when said C-ring is in a retention position, and said peripheral groove having a depth to enable compression of the C-ring to a release position in which substantially all of the C-ring is in said peripheral groove.

BEST MODE FOR CARRYING OUT THE INVENTION

Figure 1:
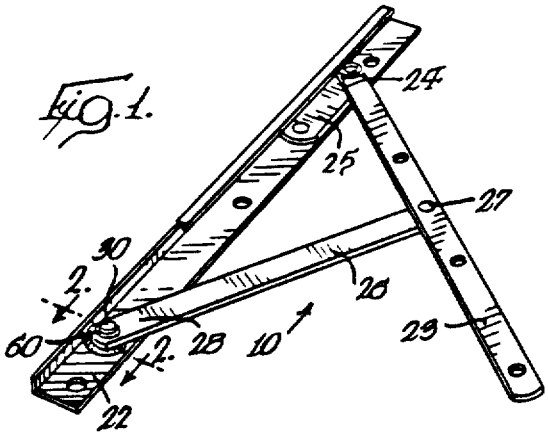
FIG. 1 is a perspective view of a window hinge utilizing the snap stud.

As previously mentioned, there are different types of window hardware which have releasable pivotally interconnected members including window operators and window hinges. The snap stud embodying the invention is shown in association with a window hinge and it will be understood that the snap stud also has utility in a window operator.

The window hinge, indicated generally at 10, mounts a window sash (not shown).

The window hinge has a guide track 22 mountable to the sill of a window frame. A sash arm 23 fastens to the underside of a window sash and at one end is pivoted at 24 to a slider or shoe 25 which is movably mounted in the guide track 22. A support arm 26 has one end pivotally connected at 27 to the sash arm 23 and at its other end 28 is pivotally connected to the guide track 22 by a snap stud, indicated generally at 30.

The snap stud 30 functions to releasably retain the support arm and the guide track in pivotally interconnected relation.

Figure 2:
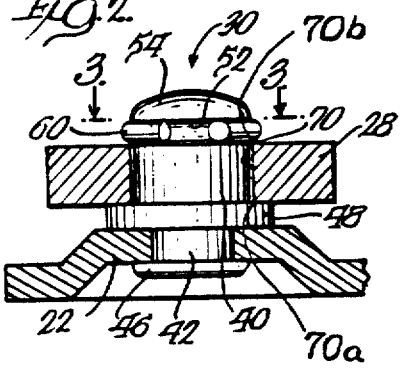
FIG. 2 is a fragmentary vertical section, taken generally along the line 2—2 in FIG. 1.
Figure 4:
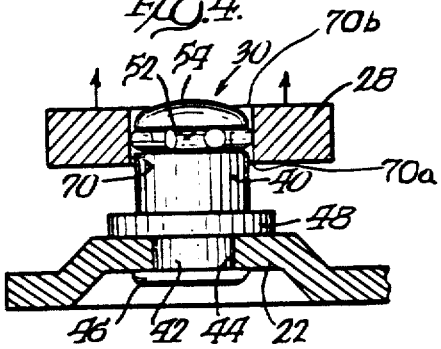
FIG. 4 is a view, similar to FIG. 2, showing the snap stud action that occurs during an assembly operation.
Figure 3:
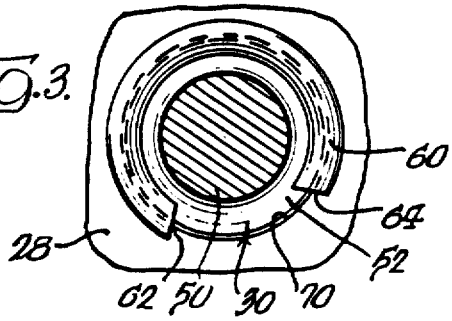
FIG. 3 is a plan section, taken generally along the line 3—3 in FIG. 2.

The snap stud is shown more particularly in FIGS. 2–4. The snap stud comprises a cylindrical stud 40 which extends from the guide track 22 and is fixed thereto. The stud has a tubular lower part of reduced diameter extending through an opening 44 in the guide track 22 and pressed outwardly to form a rim 46. The guide track 22 is captured between a flange 48 on the stud and the rim 46.

The stud 40 has a stud section 50 with an external peripheral groove 52 defining a neck adjacent a head 54 at the free end of the stud. A C-ring 60 of round spring music wire is positioned in the external peripheral groove 52. The C-ring is partially circular and has an inner diameter less than the diameter of the stud 40 and an outer diameter larger than the stud 40. As seen in FIGS. 2 and 3, the C-ring has a retention position wherein part of the spring is within the external peripheral groove 52 and part thereof extends beyond the periphery of the stud 40. The C-ring has spaced-apart ends 62 and 64 which are spaced apart less than the diameter of the stud base section 50 whereby the C-ring must be forced into position in the external peripheral groove 52 in assembly and, thereafter, is retained in assembled relation. The external peripheral groove 52 has a depth approximately equal to the diameter of the spring music wire.

The action of the snap stud in releasably retaining the window hardware members in pivotally interconnected relation is best seen in FIG. 2. The external peripheral groove 52 is at a distance from the stud flange 48 at least equal to the thickness of the support arm, and the C-ring 60 is in its retention position and overlies the end 28 of the support arm. The support arm has an opening 70 to receive the snap stud which is of a diameter less than the outer diameter of the C-ring and greater than the diameter of the annular axis of the C-ring when the latter is in its retention position. In assembly or disassembly of the window hardware members relative to each other, the C-ring 60 is compressed by the support arm 26 to a position where it lies substantially entirely within the external peripheral groove 52, as illustrated in FIG. 4, whereby the support arm can move to and from its associated position with the guide track 22. The action of the support arm in compressing the C-ring 60 is facilitated by the camming action derived from the roundness of the wire used in forming the C-ring and, as shown in FIGS. 2 and 3, the engagement of the edge 70a of the opening 70 with the C-ring radially outwardly of the annular axis of the C-ring. The opposite edge 70b of the opening 70 functions similarly to cam the C-ring radially inwardly when installing the arm 28 about the stud 30.

As shown in FIGS. 2 and 4, the edges 70a and 70b are 90° in cross section, i.e., define non-bevelled camming edges of the support arm at the opposite ends of the opening.

From the foregoing, it will be evident that two window hardware members can be releasably pivotally interconnected merely by forcing the stud 40 into the opening 70 of the support arm 26 with automatic compression of the C-ring 60 and, after the members are assembled into the position shown in FIG. 2, the C-ring returns to a retention position to maintain the members in assembled relation. The snap stud emits a positive "snap" sound when the parts reach the assembled position shown in FIG. 2, thus signalling proper interconnection of the members.

When the snap stud is used to pivotally interconnect a support arm of a window hinge to a track associated with the window sash, it is possible to utilize a simplified support arm having openings of the same size adjacent each end thereof, with one opening being used for the pivot connection to the sash arm and the other for association with the snap stud. This simplification of the support arm in not requiring a mounting for a slidable keeper facilitates the automatic assembly of the window hinge by avoiding the necessity for orienting one particular end of the support arm in a particular position.

The snap stud can be used in a window operator of the type shown in Van Klompenburg U.S. Pat. No. 4,241,541 to pivotally interconnect the connecting link 41 and the bracket 42.

We claim:

1. A releasable connection means *for holding two window hardware members in pivotally connected relationship, said connection means comprising:* a snap stud [for mounting on a first member] *having a generally cylindrical stud; a first member; means attaching the cylindrical stud to the first member so that the cylindrical stud and first member are fixed against relative movement axially of the cylindrical stud*; and a second member having a through opening [and defining at an end thereof an annular edge having a substantially right angle cross section], said snap stud extending through said opening [for] *and* releasably holding said second member in pivotal relation with said first member, said [snap stud comprising a generally] cylindrical stud having an external peripheral groove intermediate the ends of the stud, and a C-ring of [spring wire] *substantially incompressible spring-type material extending through more than 180°, surrounding said cylindrical stud,* defining an annular centerline positioned in said peripheral groove and having a pair of spaced-apart ends, said C-ring having inner and outer diameters selected to have a part thereof in said peripheral groove and a part extending *radially* beyond the stud periphery when said C-ring is in a retention position, the diameter of [said edge] *at least a portion* of the *through* opening of the second member being less than the outer diameter of the C-ring *in its retention position* and *at all times* greater than the diameter of said annular centerline of the C-ring [when the C-ring is in said retention position], and said peripheral groove having a depth to enable [compression] *deformation* of the C-ring *by movement of said spaced-apart ends towards each other* to a release position in which substantially all of the C-ring is in said peripheral groove and which enables disassembly of said pair of members by pulling one member away from the other axially of the stud.

2. A snap stud as defined in claim 1 wherein said [spring] *C-ring* is formed from round spring music wire.

3. A snap stud as defined in claim 2 wherein said external peripheral groove on the stud has a depth substantially equal to the diameter of the spring music wire.

4. A snap stud as defined in claim 1 wherein said external peripheral groove defines a stud section of reduced diameter, and the ends of said C-ring are spaced apart a distance less than the diameter of said stud section whereby the C-ring is forced onto the stud section when placed in said external peripheral groove, in assembly, and is thereafter retained in said groove.

5. A snap stud as defined in claim 4 wherein said ends of the C-ring are shaped to facilitate expansion of the C-ring as the latter is forced onto the stud section in assembly.

[6. A snap stud as defined in claim 1 wherein said second member at the opposite end of the opening defines an annular edge having a substantially right angle cross section.]

*7. A snap stud as defined in claim 1 wherein said snap stud has an integral radially enlarged flange for maintaining the first and second members spaced axially from each other.*

*8. A releasable connection means for holding two window hardware members in pivotally connected relationship, said connection means comprising: a snap stud having a generally cylindrical stud; a first member; means attaching the cylindrical stud to the first member so that the cylindrical stud and first member are fixed against relative movement axially of the cylindrical stud; and a second member having a through opening, said snap stud extending through said opening and releasably holding said second member in pivotal relation with said first member, said cylindrical stud having an external peripheral groove intermediate the ends of the stud, and a C-ring of spring wire defining an annular centerline positioned in said peripheral groove and having a pair of spaced-apart ends, said C-ring having inner and outer diameters selected to have a part thereof in said peripheral groove and a part extending beyond the stud periphery when said C-ring is in a retention position, the diameter of at least a portion of the through opening of the second member being less than the outer diameter of the C-ring and greater than the diameter of said annular centerline of the C-ring when the C-ring is in said retention position, and said peripheral groove having a depth to enable deformation of the C-ring to a release position in which substantially all of the C-ring is in said peripheral groove and which enables disassembly of said pair of members by pulling one member away from the other axially of the stud, wherein the means attaching the cylindrical stud to the first member comprises an integral flange stud to the first member comprises an integral flange and an integral rim on the snap stud and in axially spaced relationship, said first member being held captive between the flange and rim and maintained axially spaced from the second member by the flange.*

*9. Window hardware utilizing a snap stud, said window hardware comprising: a first member; a second member having a through opening; said snap stud having a generally cylindrical stud; means attaching the cylindrical stud to the first member so that the stud and first member are fixed against relative movement axially of the cylindrical stud; said snap stud extending through said opening in the second member and releasably holding said second member in pivotal relation with said first member, said cylindrical stud having an external peripheral groove intermediate the ends of the stud, and a C-ring of substantially incompressible spring-type material extending through more than 180°, surrounding said cylindrical stud, defining an annular centerline positioned within said peripheral groove and having a pair of spaced-apart ends, said C-ring having inner and outer diameters selected to have a part thereof in said peripheral groove and a part extending radially beyond the stud periphery when said C-ring is in a retention position, the diameter of at least a portion of said through opening in the second member being less than the outer diameter of the C-ring in its retention position and at all times greater than the diameter of said annular centerline of the C-ring and said peripheral groove having a depth to enable deformation of the C-ring by movement of said spaced-apart ends towards each other to a release position in which substantially all of the C-ring is in said peripheral groove and which enables disassembly of said pair of members by pulling one member away from the other axially of the stud, wherein said second member at said portion of the through opening engages said C-ring through an arc of at least 180° as said C-ring is deformed by the second member during assembly and disassembly of said first and second members.*

*10. The window hardware as defined in claim 9 wherein said window hardware is a window hinge comprising a guide track for connection to the sill of a window frame, a slider movably mounted in the guide track, a sash arm for attachment to a window sash and having an end connected to the slider, a support arm having an end pivotally connected to the sash arm and an opposite end connected pivotally to the guide track, said first member comprises the guide track and said second member comprises the support arm.*

*11. A window hinge utilizing a snap stud having a cylindrical stud, said window hinge comprising: a guide track for connection to a sill on a window frame; a slider movably mounted relative to the guide track; a sash arm for attachment to a window sash and having an end operatively connected to the slider; a support arm having a through opening; means fixedly attaching the cylindrical stud to the guide track; said snap stud extending through said opening and releasably holding said support arm in pivotal relation with said guide track, said cylindrical stud having an external peripheral groove intermediate the ends of the stud, and a C-ring of substantially incompressible spring-type material extending through more than 180°, surrounding said cylindrical stud, defining an annular centerline positioned in said peripheral groove and having a pair of spaced-apart ends, said C-ring having inner and outer diameters selected to have a part thereof in said peripheral groove and a part extending beyond the stud periphery when said C-ring is in a retention position, the diameter of at least a portion of said through opening of the support arm being less than the outer diameter of the C-ring in its retention position and at all times greater than the diameter of said annular centerline of the C-ring and said peripheral groove having a depth to enable deformation of the C-ring to a release position in which substantially all of the C-ring is in said peripheral groove and which enables disassembly of said support arm and guide track by pulling one of the support arm and guide track away from the other of the support arm and guide track axially of the stud.*

* * * * *